(12) United States Patent
Gautier-Le Boulch

(10) Patent No.: US 12,338,898 B2
(45) Date of Patent: Jun. 24, 2025

(54) EXPANDABLE TUBULAR ELEMENT FOR INFLATABLE CYLINDER

(71) Applicant: ECLORE ACTUATORS, Nantes (FR)

(72) Inventor: Pierre Gautier-Le Boulch, Nantes (FR)

(73) Assignee: ECLORE ACTUATORS, Nantes (FR)

( * ) Notice: Subject to any disclaimer, the term of this patent is extended or adjusted under 35 U.S.C. 154(b) by 128 days.

(21) Appl. No.: 17/797,587

(22) PCT Filed: Feb. 2, 2021

(86) PCT No.: PCT/EP2021/052409
§ 371 (c)(1),
(2) Date: Aug. 4, 2022

(87) PCT Pub. No.: WO2021/156240
PCT Pub. Date: Aug. 12, 2021

(65) Prior Publication Data
US 2023/0048924 A1 Feb. 16, 2023

(30) Foreign Application Priority Data

Feb. 6, 2020 (FR) .................................. FR2001159

(51) Int. Cl.
*F15B 15/10* (2006.01)
*F16J 3/06* (2006.01)

(52) U.S. Cl.
CPC ................. *F16J 3/06* (2013.01); *F15B 15/10* (2013.01)

(58) Field of Classification Search
CPC ............ F15B 15/10; F15B 15/103; F16J 3/06
See application file for complete search history.

(56) References Cited

U.S. PATENT DOCUMENTS

| 2,844,126 | A | * | 7/1958 | Gaylord | ................ F15B 15/103 138/30 |
| 3,319,532 | A | | 5/1967 | Pridham | |
| 3,721,371 | A | | 3/1973 | Dolvek | |
| 4,826,206 | A | * | 5/1989 | Immega | ................ F16F 15/027 92/92 |
| 4,839,982 | A | * | 6/1989 | Wood | ..................... A01K 85/01 43/44.4 |

(Continued)

FOREIGN PATENT DOCUMENTS

| DE | 10 2010 007740 A1 | 8/2011 |
| EP | 3318782 A1 | 5/2018 |

(Continued)

*Primary Examiner* — Dustin T Nguyen
(74) *Attorney, Agent, or Firm* — Maschoff Brennan

(57) ABSTRACT

The invention relates to an expandable tubular element for a fluid-inflatable cylinder, comprising a peripheral wall that is fluid-tight and formed by a plurality of panels connected in pairs by substantially rectilinear links each representing a pivot axis, the panels being more rigid than the links, so that two panels adjacent to a link can rotate about the pivot axis represented by this link, each end of a link being connected to at least two ends of other links so as to define a node, each node having a thickness greater than the minimum thickness of the adjacent links. The invention also relates to a method for producing such an expandable tubular element, as well as a fluid-inflatable cylinder comprising such an expandable tubular element.

12 Claims, 6 Drawing Sheets

(56) References Cited

U.S. PATENT DOCUMENTS

| | | | | |
|---|---|---|---|---|
| 5,181,452 | A * | 1/1993 | Immega | B25J 18/06 92/92 |
| 5,317,952 | A * | 6/1994 | Immega | F15B 15/10 901/22 |
| 9,624,911 | B1 * | 4/2017 | Griffith | F24S 23/74 |
| 10,100,550 | B2 * | 10/2018 | Chen | B64G 99/00 |
| 10,135,388 | B2 * | 11/2018 | Madrone | H02S 20/30 |
| 11,572,949 | B1 * | 2/2023 | Kim | F16J 3/041 |
| 11,821,412 | B2 * | 11/2023 | Dicker | F15B 15/103 |
| 2018/0278200 | A1 * | 9/2018 | Jeon | H02S 30/20 |
| 2023/0313819 | A1 * | 10/2023 | Tao | F15B 15/10 92/90 |

FOREIGN PATENT DOCUMENTS

| | | | | |
|---|---|---|---|---|
| JP | 2012-92956 | * | 10/2010 | F15B 15/10 |
| JP | 2012-092956 A | | 5/2012 | |
| JP | 2015-33772 | * | 8/2013 | B31F 1/08 |

* cited by examiner

[Fig. 1A]
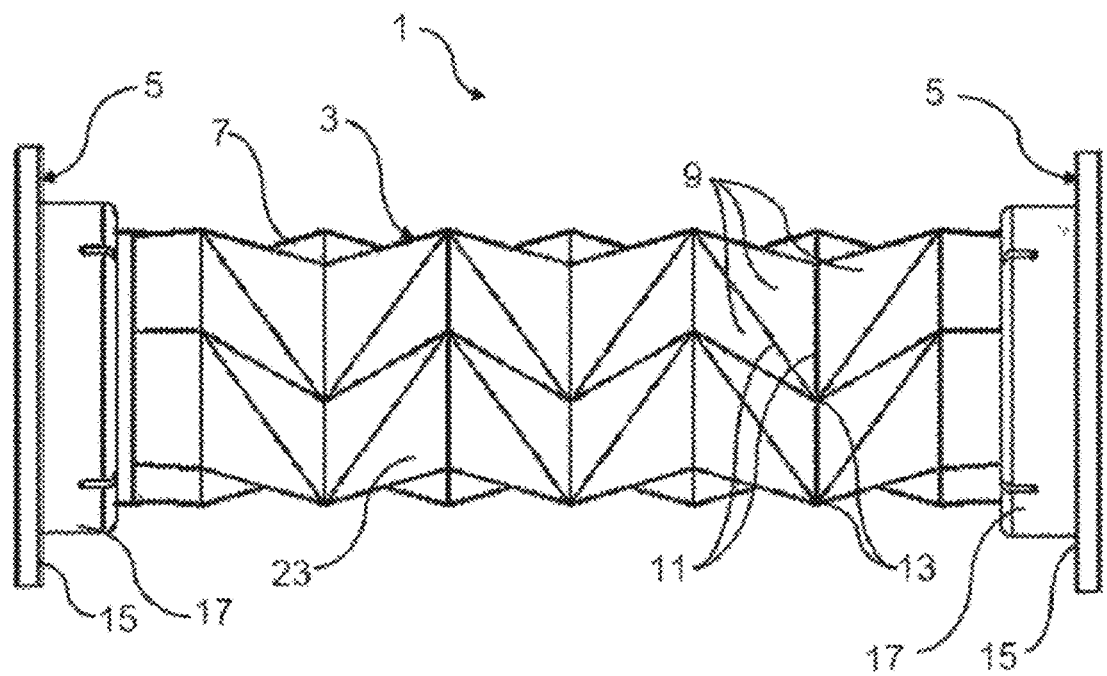
[Fig. 1B]
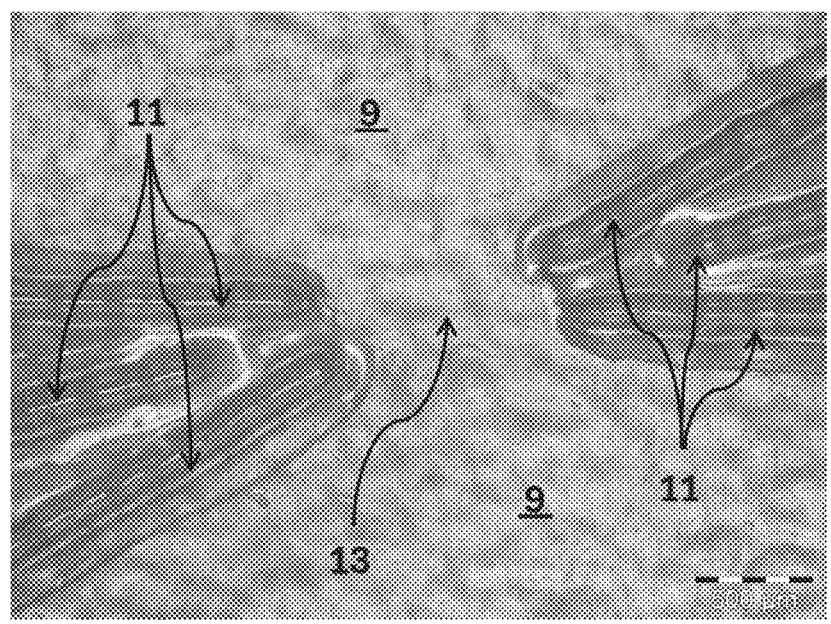

[Fig. 2]
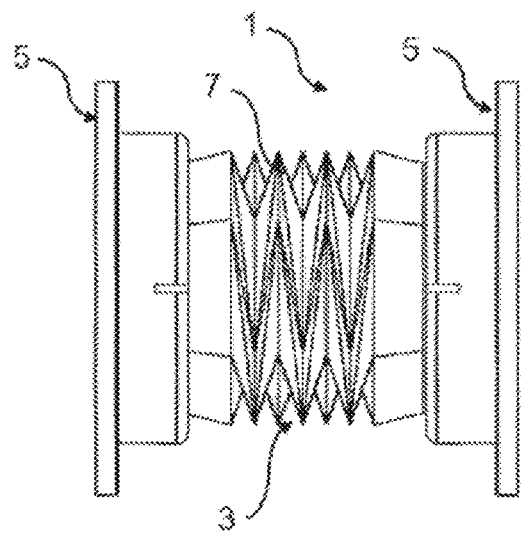
[Fig. 3]
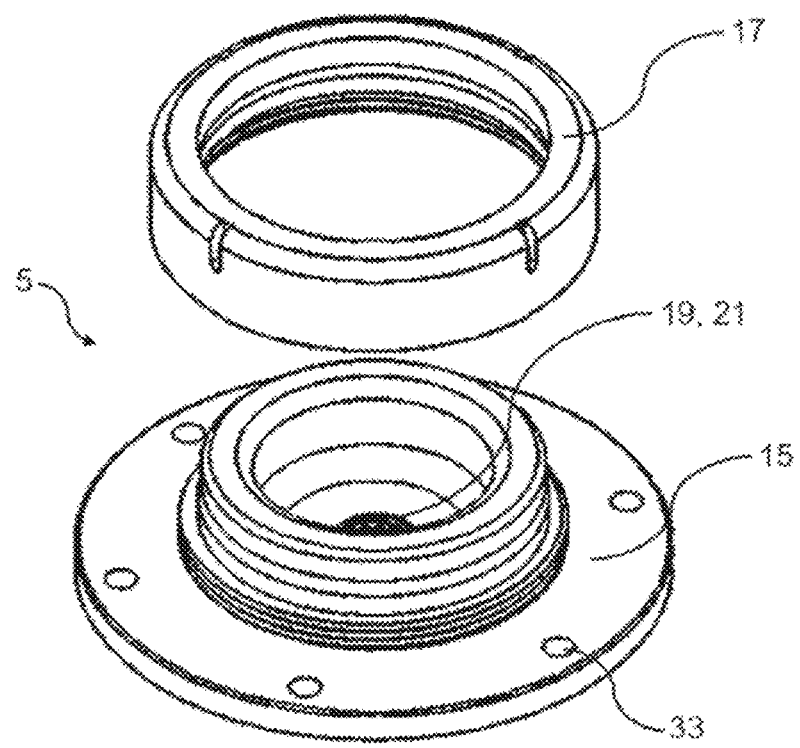

[Fig. 4]
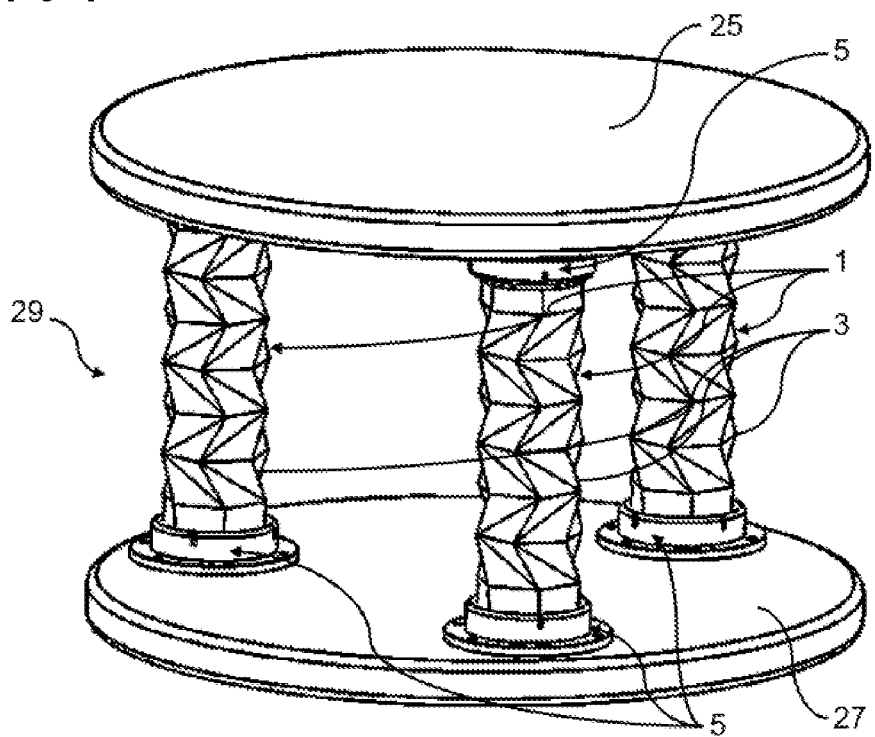
[Fig. 5]
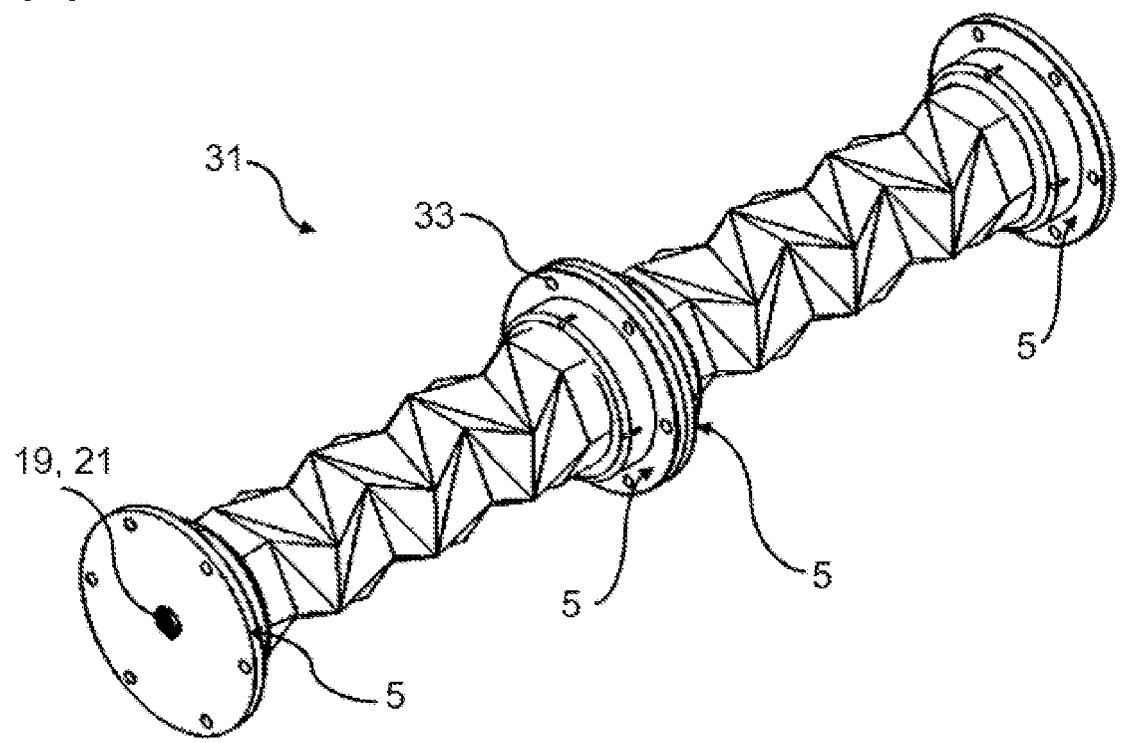

[Fig. 6]
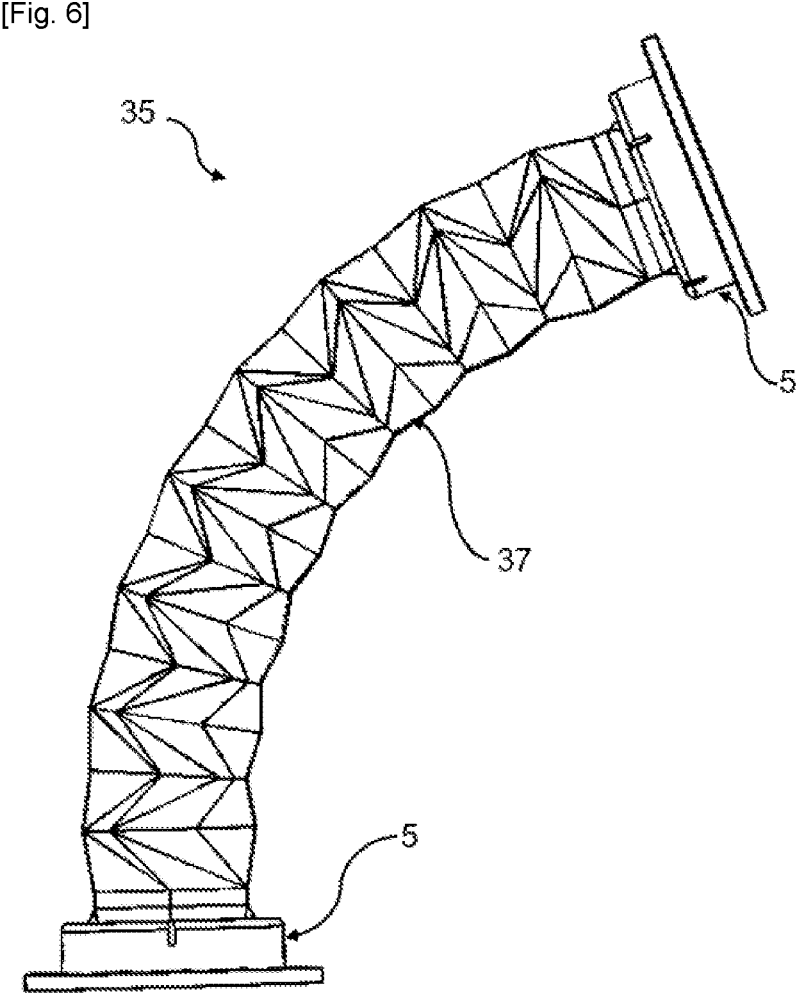
[Fig. 7]
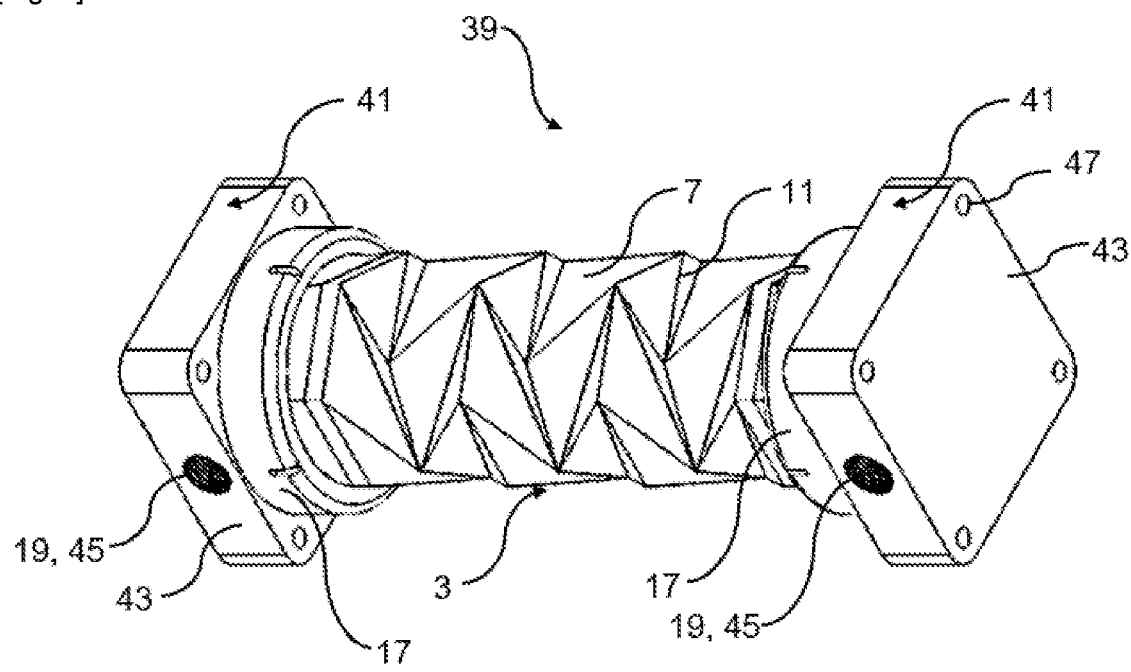

[Fig. 8]
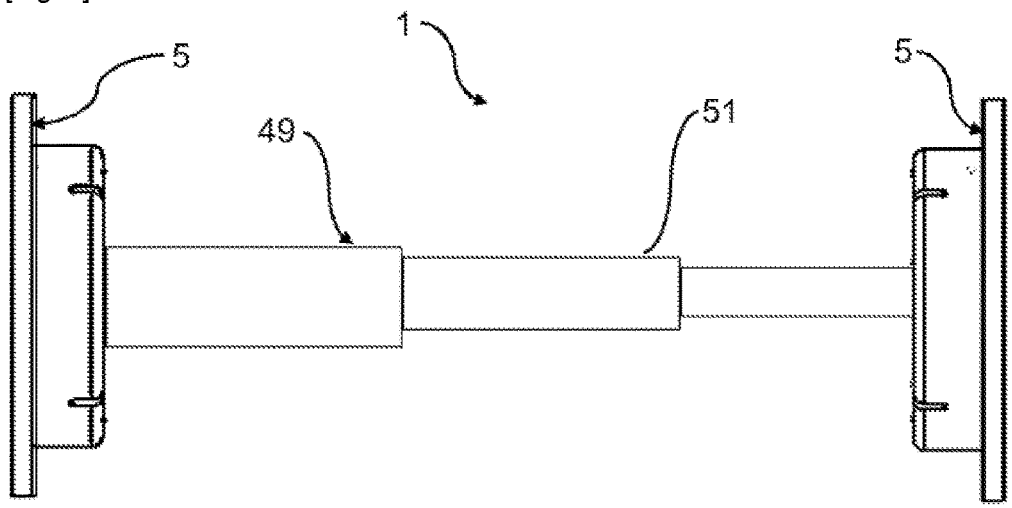
[Fig. 9]
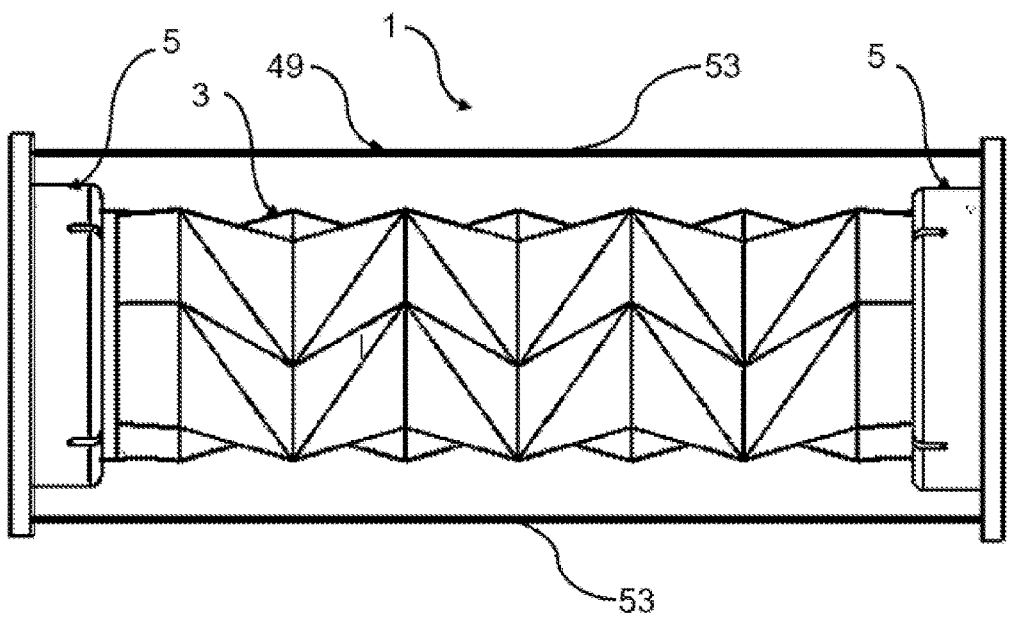
[Fig. 10]
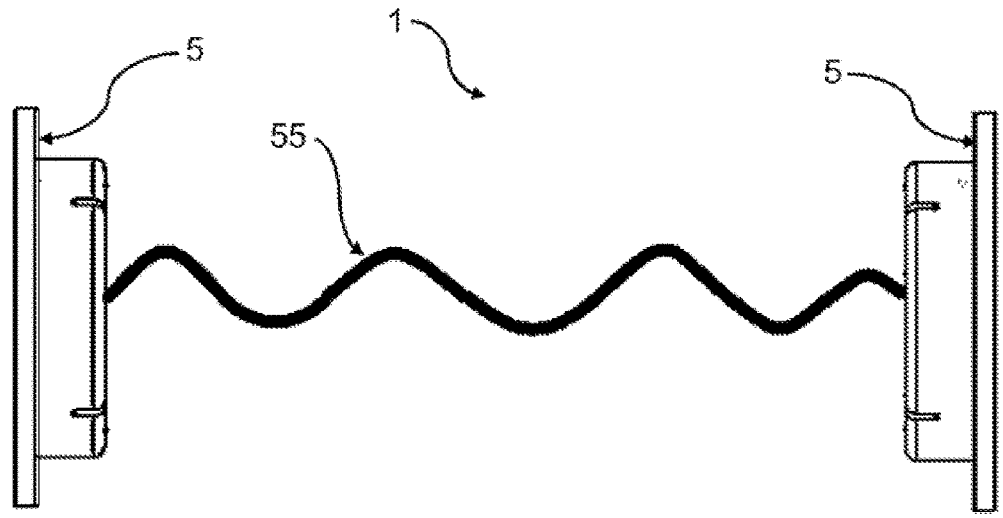

[Fig. 11]
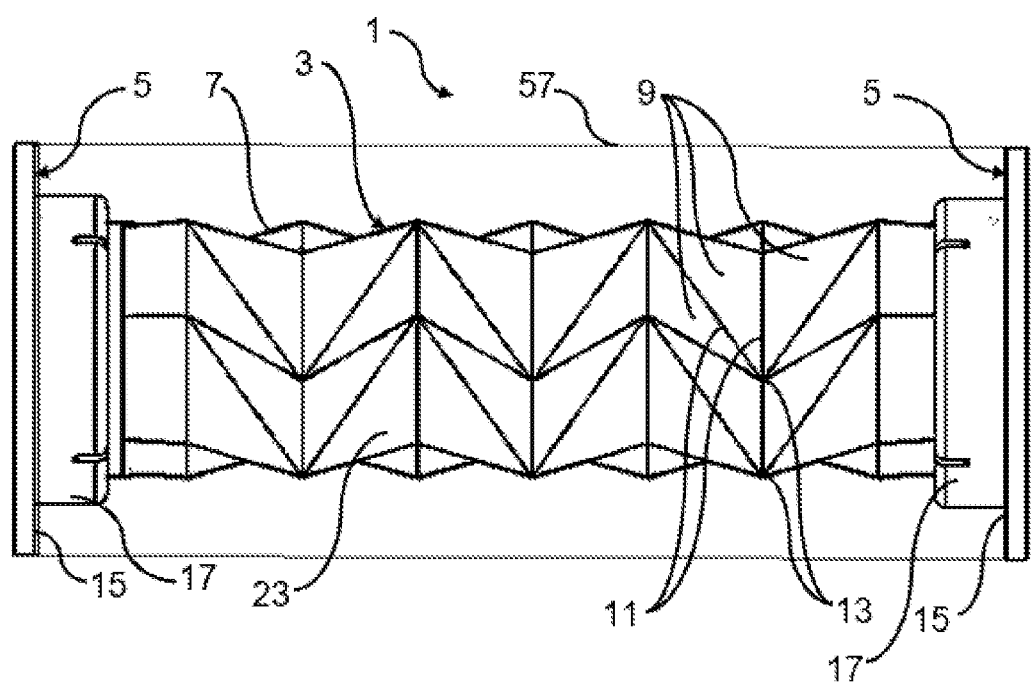

EXPANDABLE TUBULAR ELEMENT FOR INFLATABLE CYLINDER

The invention relates to the field of inflatable cylinders.

These inflatable cylinders are generally used for a device such as a shock absorber or an actuator.

Such inflatable cylinders are generally inflated with air, but can also be used with water, oil, glycol, or more generally a fluid. These inflatable cylinders, also called airbags, are generally composed of an expandable tubular element made of rubber or plastic material, optionally surmounted by an end piece or arranged between two end pieces. The tubular element generally comprises a peripheral wall in the form of a cylindrical accordion bellows, and is for example obtained by blow moulding a parison of thermoplastic elastomer material. The end piece(s) are generally metallic, and are engaged with mechanical elements which are configured to be driven by the inflatable cylinder. To allow good compressibility of the tubular element and limit the size of the inflatable cylinder, the peripheral wall of the tubular element has a variable thickness.

However, such thickness variation leads to manufacturing difficulties and to areas that are less resistant to pressure, in particular when the inflatable cylinder is fully inflated. In case of overpressure, in fact, since the peripheral wall of the tubular element has a variable thickness, the tubular element may undergo significant local deformation beyond its maximum desired shape at the thinnest area, i.e. a circular cross-section of the cylindrical bellows. Thus, the resistance to pressure of such a tubular element for an inflatable cylinder is low considering the lowest thickness of the peripheral wall of the tubular member.

Thus, due to their design, current inflatable cylinders cannot have both a small size and optimum resistance to pressure.

The invention aims in particular to provide an expandable tubular element for an inflatable cylinder, having both a limited size and optimum resistance to pressure.

To this end, the invention relates to an expandable tubular element for a fluid-inflatable cylinder, comprising a peripheral wall, that is fluid-tight and formed by a plurality of panels connected in pairs by substantially rectilinear links each representing a pivot axis, the panels being more rigid than the links, so that two panels adjacent to a link can rotate about the pivot axis represented by this link, each end of a link being connected to at least two ends of other links so as to define a node, each node having a thickness greater than the minimum thickness of the adjacent links.

Thus, it is proposed to perform the invention by providing an expandable tubular element, in which the nodes reinforce the structure. Even with links of low thickness, in fact, the expandable tubular element undergoes a limited radial deformation due to the presence of the nodes. Thus, the resistance to pressure of the expandable tubular element is improved. The structure composed of panels, links and nodes allows maximum compressibility of the expandable tubular element and thus minimum size of the expandable tubular element in the compressed state.

According to other optional characteristics of the expandable tubular element, taken alone or in combination:

The links are made mainly of plastic material. "Mainly" means mainly by weight. Thus, manufacture is simplified.

The panels have a polygonal, preferably triangular, shape. Thus, the compressibility and resistance of the expandable tubular element are improved.

The panels have a substantially uniform thickness. Thus, manufacture is simplified.

The nodes have substantially the same thickness as the panels. Thus, the size of the expandable tubular element is further reduced.

At least one of the links has a composition that is the same as at least some of the panels adjacent to said link and, at least in places, a thickness that is less than that of these panels. Thus, manufacture of the expandable tubular element is simplified, and the expandable tubular element is easy to compress.

The panels and the links have the same composition. Thus, manufacture is simplified.

The panels are made mainly of plastic material. "Mainly" means mainly by weight. Thus, manufacture is simplified.

The peripheral wall is made mainly of plastic material. "Mainly" means mainly by weight. Thus, manufacture is simplified.

The peripheral wall is formed by the panels and the links.

The peripheral wall is composed of a composite or multilayer material, which preferably comprises a polymer and/or elastomer material, more preferably polypropylene and/or polyethylene. Thus, the resistance to pressure of the expandable tubular element is improved.

The peripheral wall is composed of a composite or multilayer material, which preferably comprises a metallic material. Thus, the resistance to pressure of the expandable tubular element is improved.

The peripheral wall is composed of a multilayer material and comprises an electrically conductive layer, preferably metallic, more preferably consisting of a conductive ink and/or a metallic film arranged on the inner and/or outer surface of the peripheral wall. Thus, the expandable tubular element can conduct electricity, for example to supply elements located downstream from the expandable tubular element with respect to a source of electrical energy, and/or to act as a sensor since the electrical resistance of the expandable tubular element is modified depending on its deformation state.

The electrically conductive layer is the innermost layer. Thus, the connection to a device located inside the expandable tubular element, such as a source of electrical energy, a transducer or an antenna, is simplified.

The electrically conductive layer is the outermost layer. Thus, the connection to a device located outside the expandable tubular element, such as a source of electrical energy, a transducer or an antenna, is simplified.

At least one of the links is formed by an adhesive film connecting two adjacent panels. Thus, manufacture of the tubular element is simplified.

The invention also relates to a fluid-inflatable cylinder, comprising an expandable tubular element of the above-mentioned type and an end piece attached to one end of the expandable tubular element.

According to other optional characteristics of the inflatable cylinder, taken alone or in combination:

The end piece comprises a means for supplying and/or evacuating fluid, the expandable tubular element being configured to switch from a retracted mode in which it has a first inner volume to an expanded mode in which it has a second inner volume and a substantially cylindrical shape, the second inner volume being greater than the first inner volume, preferably by at least a factor of 10, more preferably by at least a factor of 100. Thus, by providing an inflatable cylinder equipped with an expandable tubular element in which the end piece comprises a means for supplying and/or evacuating fluid, the structure of the expandable tubular element in the form of panels, links and nodes allows maximum compressibility of the expandable tubular element and thus minimum size of the expandable tubular element when the inflatable cylinder is in the retracted state, while ensuring high resistance to pressure when the inflatable cylinder is in the expanded state.

The expandable tubular element has a substantially bent cylindrical shape in the expanded mode. Thus, actuation can be obtained in any desired spatial direction.

The fluid pressure inside the expandable tubular element is between 0 and 1 bar when the expandable tubular element is in a retracted mode.

The fluid pressure inside the expandable tubular element is between 1 and 12 bar when the expandable tubular element is in an expanded mode.

The inflatable cylinder further comprises guide means for guiding the displacement of the expandable tubular element between its retracted mode and its expanded mode and vice versa, preferably a telescopic guide rod.

The guide means are arranged in the internal space delimited by the peripheral wall of the expandable tubular element.

The guide means are arranged outside the internal space delimited by the peripheral wall of the expandable tubular element, and are preferably evenly distributed around the periphery of the expandable tubular element.

The inflatable cylinder comprises two end pieces, each end piece being attached to one end of the expandable tubular element.

The inflatable cylinder comprises means for limiting the stroke, for example composed of a sheath, preferably textile, arranged outside the peripheral wall of the expandable tubular element.

The inflatable cylinder comprises a means for transferring energy, preferably a fluid transfer pipe and/or an electric cable, arranged in the internal space of the expandable tubular element.

The inflatable cylinder comprises at least two expandable tubular elements.

The expandable tubular elements are arranged in series.

The adjacent expandable tubular elements arranged in series are connected to each other via at least one end piece.

The inflatable cylinder comprises at least three expandable tubular elements.

The expandable tubular elements are arranged in parallel.

The expandable tubular elements arranged in parallel each comprise an end piece and jointly support a plate.

The peripheral wall is bonded to the end piece. Thus, it is particularly easy to attach the expandable tubular element to the end piece.

The end piece comprises a flange and an attachment element, the peripheral wall being held in the end piece by clamping between the flange and the attachment element. Thus, it is particularly easy to attach the expandable tubular element to the end piece.

Lastly, the invention relates to a method for manufacturing an expandable tubular element of the above-mentioned type, which comprises the following steps:
  manufacturing a tube made mainly of plastic material,
  producing a plurality of patterns on the tube by engraving and/or marking means,
  deforming the patterns, so that the patterns in the deformed state form the links, the step of deforming the patterns being carried out by reducing the pressure inside the tube, preferably to a pressure of between 0 and 0.5 bar, and/or by simultaneously mechanically pressing on the patterns arranged on a given cross-section of the tube.

Thus, the manufacture of an expandable tubular element is simple and inexpensive.

According to other optional characteristics of the manufacturing method, taken alone or in combination:
  The patterns are for example cylindrical patterns, of the type known under the name of Yoshimura, Waterbomb, Kresling or Chicken Wire pattern, preferably of the Kresling type.
  The step of deforming the patterns is a folding step.
  The step of manufacturing a tube made mainly of plastic material is a step of manufacturing a tube made only of plastic material.
  The step of manufacturing a tube made mainly of plastic material is carried out by thermoforming, injection blow moulding, moulding or rotational moulding.
  The engraving means comprise a laser.
  The marking means comprise a wheel.
  The step of producing a plurality of patterns on the tube by an engraving and/or marking means is carried out by laser engraving then by marking with a wheel.
  The method comprises, preferably after the step of deforming the patterns, a step of curing by annealing the expandable tubular element thus obtained, so that its mode at rest is the retracted mode.

BRIEF DESCRIPTION OF THE FIGURES

The invention will be better understood on reading the following description, given solely by way of example and with reference to the accompanying drawings in which:

FIG. 1A is a schematic front view of an inflatable cylinder according to a first embodiment, in the expanded state;

FIG. 1B is an annotated photograph of an inflatable cylinder according to one or more embodiments of the present disclosure;

FIG. 2 is a schematic front view of an inflatable cylinder equipped with an expandable tubular element according to the first embodiment, in the retracted state;

FIG. 3 is a schematic perspective view of an end piece according to a first variant;

FIG. 4 is a schematic perspective view of an inflatable cylinder according to a second embodiment, in the expanded state;

FIG. 5 is a schematic perspective view of an inflatable cylinder according to a third embodiment, in the expanded state;

FIG. 6 is a schematic front view of an inflatable cylinder according to a fourth embodiment, in the expanded state;

FIG. 7 is a schematic perspective view of an inflatable cylinder according to a fifth embodiment, in the expanded state, which is equipped with end pieces according to a second variant;

FIG. 8 is a partial schematic front view of an inflatable cylinder according to a variant of the first embodiment, in the expanded state;

FIG. 9 is a schematic front view of an inflatable cylinder according to a variant of the first embodiment, in the expanded state;

FIG. 10 is a partial schematic front view of an inflatable cylinder according to a variant of the first embodiment, in the expanded state;

FIG. 11 is a partial schematic front view of an inflatable cylinder according to a variant of the first embodiment, in the expanded state.

DETAILED DESCRIPTION

FIG. 1 shows an inflatable cylinder 1 according to a first embodiment. The inflatable cylinder 1 can be inflated by a fluid, for example air or water. The inflatable cylinder 1 comprises an expandable tubular element 3 and an end piece 5 according to a first variant, attached to one end of the expandable tubular element 3. In the example shown on FIG. 1, the inflatable cylinder 1 comprises two end pieces 5, each end piece 5 being attached to one end of the expandable tubular element 3.

The expandable tubular element 3 comprises a peripheral wall 7.

The peripheral wall 7 is fluid-tight. The peripheral wall 7 is formed by a plurality of panels 9 connected in pairs by substantially rectilinear links 11 each representing a pivot axis.

The panels 9 are more rigid than the links 11. Thus, two panels 9 adjacent to a link 11 can rotate about the pivot axis represented by this link 11. In the example shown on FIG. 1, the panels 9 have a triangular shape. More generally, the panels 9 can have a polygonal shape. In the example shown on FIG. 1, the panels 9 have a substantially uniform thickness.

Each link 11 has two ends. Each end of a link 11 is connected to at least two ends of other links 11 so as to define a node 13. In the example shown on FIG. 1, the links 11 have a composition that is the same as that of the panels 9 adjacent to said link 11 and, at least in places, a thickness that is less than that of these panels 9.

Each node 13 has a thickness greater than the minimum thickness of the adjacent links 11. Furthermore, in the example shown on FIG. 1, the nodes have substantially the same thickness as the panels 9.

As shown on FIGS. 1 and 3, each end piece 5 comprises a flange 15 and an attachment element 17. Thus, the peripheral wall 7 is held in the end piece 5 by clamping between the flange 15 and the attachment element 17. The attachment element 17 and the flange 15 each comprise a thread, so that the attachment element 17 is attached to the flange 15 by screwing. In this example, the flange 15 has a substantially cylindrical shape.

At least one end piece 5, for example each end piece 5, comprises a means 19 for supplying and/or evacuating fluid, for example a central hole 21, which opens into the internal space delimited by the peripheral wall 7 of the expandable tubular element 3. In the example shown on FIG. 1, the central hole 21 is threaded to allow connection to a fluid supply and/or evacuation element, such as for example a flexible pipe end fitting.

The expandable tubular element 3 is thus configured to switch from a retracted mode in which it has a first inner volume, as shown on FIG. 2, to an expanded mode in which it has a second inner volume and a substantially cylindrical shape, as shown on FIG. 1, and vice versa. The second inner volume is greater than the first inner volume, preferably by at least a factor of 10, more preferably by at least a factor of 100.

The fluid pressure inside the expandable tubular element 3 is preferably between 0 and 1 bar when the expandable tubular element is in a retracted mode. —The fluid pressure inside the expandable tubular element 3 is between 1 and 12 bar when the expandable tubular element is in an expanded mode.

The peripheral wall 7 is made mainly of plastic material. Thus, the peripheral wall 7 is formed by the panels 9 and the links 11, the links 11 being made mainly of plastic material and the panels 9 being made mainly of plastic material. In the example shown on FIG. 1, the peripheral wall 7 is composed of a multilayer material, which preferably comprises a polymer and/or elastomer material, more preferably polypropylene and/or polyethylene. More precisely, the peripheral wall 7 comprises a main layer mainly or entirely composed of a plastic material, preferably a polymer and/or elastomer material, more preferably polypropylene and/or polyethylene. The peripheral wall 7 also comprises an electrically conductive layer 23, preferably metallic, more preferably consisting of a conductive ink and/or a metallic film arranged on the inner and/or outer surface of the peripheral wall 7. The electrically conductive layer is the innermost layer, and/or as shown on FIG. 1, the electrically conductive layer 23 is the outermost layer.

As an alternative or in addition, the peripheral wall 7 or its main layer may be composed of a composite material. Thus, the peripheral wall 7 or its main layer may be made of a material selected from the group comprising thermoplastic resin, preferably polypropylene and/or polyethylene, preferably reinforced with carbon fibres, glass fibres, natural fibres and/or Kevlar (registered trademark).

Each end piece 5 is for example made of plastic, composite or metallic material. If the end piece 5 is made of composite material, it can be made of thermosetting resin, preferably epoxy, polyurethane or polyester resin, preferably reinforced with carbon fibres, glass fibres, natural fibres or Kevlar (registered trademark).

In a second embodiment shown on FIG. 4, an inflatable cylinder 25 comprises three expandable tubular elements 3. The expandable tubular elements 3 arranged in parallel comprise an end piece 5 at each end and jointly support a plate 25, 27. Thus, an inflatable cylinder 25 according to this second embodiment comprises three inflatable cylinders 1 according to the first embodiment described above, which are arranged in parallel between two plates 25, 27.

The inflatable cylinder 25 could obviously be made with more than three expandable tubular elements 3.

In a third embodiment shown on FIG. 5, an inflatable cylinder 31 comprises two expandable tubular elements 3. The expandable tubular elements 3 are arranged in series and comprise an end piece 5 at each end. Thus, the two expandable tubular elements 3 are connected to each other via two of their end pieces 5, which are attached opposite to each other, as shown on FIG. 5, for example by means of attachment bolts engaged in attachment holes 33 of the end pieces 5. Thus, an inflatable cylinder 31 according to this third embodiment comprises two inflatable cylinders 1 according to the first embodiment described above, which are arranged in series.

The inflatable cylinder 31 could obviously be made with more than two expandable tubular elements 3. In this case, the adjacent expandable tubular elements 3 are connected to each other via at least one end piece 5, preferably via two end pieces 5.

A fourth embodiment shown on FIG. 6 differs from the first embodiment shown on FIG. 1 in that the inflatable cylinder 35 comprises an expandable tubular element 37 which has a substantially bent cylindrical shape in the expanded mode. Apart from this special shape of the expandable tubular element 37, the inflatable cylinder 35 is similar to the inflatable cylinder 1, and comprises in particular an end piece 5 at each end of the expandable tubular element 37. Thus, apart from this special shape, the expandable tubular element 37 is similar to the expandable tubular element 3 described above. In addition, in a retracted mode, the inflatable cylinder 35 takes a shape that is similar to that shown on FIG. 2 for the inflatable cylinder 1.

A fifth embodiment shown on FIG. 6 differs from the first embodiment shown on FIG. 1 in that the inflatable cylinder 39 comprises end pieces 41 according to a second variant, arranged so as to replace the end pieces 5 described above. Each end piece 41 comprises a flange 43, in this example of substantially rectangular parallelepiped shape, and an attachment element 17. Thus, the peripheral wall 7 of the expandable tubular element 3 is held in the end piece 5 by clamping between the flange 43 and the attachment element 17. The attachment element 17 and the flange 43 each comprise a thread 15, so that the attachment element 17 is attached to the flange 43 by screwing.

At least one end piece 41, for example each end piece 41, comprises a means 19 for supplying and/or evacuating fluid, for example a lateral hole 45, which opens into the internal space delimited by the peripheral wall 7 of the expandable tubular element 3. In the example shown on FIG. 7, the lateral hole 45 is threaded to allow connection to a fluid supply and/or evacuation element, such as for example a flexible pipe end fitting. Each end piece 41 further comprises attachment holes 47, which perform functions similar to the attachment holes 33 described above. Each end piece 41 is for example made of a material similar to that described above for an end piece 5.

Different variants of the first embodiment are shown on FIGS. 8 to 10, the expandable tubular element 3 being omitted on FIGS. 8 and 10 to clearly show the internal space delimited by the peripheral wall 7 of the expandable tubular element 3.

In a variant shown on FIG. 8, the inflatable cylinder 1 comprises guide means 49 for guiding the displacement of the expandable tubular element 3 between its retracted mode and its expanded mode and vice versa. The guide means 49 are arranged in the internal space delimited by the peripheral wall 7 of the expandable tubular element 3.

The guide means 49 comprise a telescopic guide rod 51, for example metallic.

In a variant shown on FIG. 9, the inflatable cylinder 1 comprises guide means 49 for guiding the displacement of the expandable tubular element 3 between its retracted mode and its expanded mode and vice versa. The guide means 49 are arranged outside the internal space delimited by the peripheral wall 7 of the expandable tubular element 3, and are preferably evenly distributed around the periphery of the expandable tubular element 3. The guide means 49 comprise guide rods 53, for example metallic. The guide rods 53 are for example attached in the attachment holes 33 on one of the end pieces 5, and slide in the attachment holes 33 of the other end piece 5 to provide linear guiding. At least one guide rod 53 may comprise an end stop to act as stroke limiter for the inflatable cylinder 1 by preventing sliding beyond a desired distance to obtain the expanded mode of the expandable tubular element 3, the end stop then coming into contact with the end piece 5 sliding with respect to the guide rod.

In a variant shown on FIG. 10, the inflatable cylinder 1 comprises a means 55 for transferring energy, preferably a fluid transfer pipe and/or an electric cable, arranged in the internal space of the expandable tubular element 3. The means 55 for transferring energy is used to transfer energy from one end piece 5 to the other end piece 5, and for example to transfer energy to another inflatable cylinder connected to the inflatable cylinder 1 and/or to a sensor and/or to an actuating element such as a valve or a distributor. The means 55 for transferring energy may also act as stroke limiter for the inflatable cylinder 1, for example when the means 55 for transferring energy consists of a cable. The means 55 for transferring energy may have the shape of a coil, as shown on FIG. 10.

In a variant shown on FIG. 11, the inflatable cylinder 1 comprises means for limiting the stroke, for example composed of a sheath 57, preferably textile, arranged outside the peripheral wall 7 of the expandable tubular element 3. These means for limiting the stroke can be used to limit the displacement of the expandable tubular element 3 between its retracted mode and its expanded mode. Thus, they prevent sliding beyond a desired distance to obtain the expanded mode of the expandable tubular element 3, without obstructing the displacement of the expandable tubular element 3 between its expanded mode and its retracted mode. The sheath 57 is attached at its ends to the end pieces 5, for example by means of ties which tighten the diameter of the sheath 57 at its ends. Thus, it is particularly easy to assemble the sheath 57 to the inflatable cylinder 1: The sheath 57 is thus passed through the end pieces 5, then the ties are tightened to hold the sheath 57 on the end pieces 5. In the example shown on FIG. 11, the expandable tubular element 3 is in an expanded mode, the sheath 57 is thus stretched between the end pieces 5 to act as stroke limiter.

An example of a method for manufacturing an expandable tubular element will now be described.

Such a method comprises the following steps:
manufacturing a tube made mainly of plastic material,
producing a plurality of patterns on the tube by engraving and/or marking means,
deforming the patterns, so that the patterns in the deformed state form the links, the step of deforming the patterns being carried out by reducing the pressure inside the tube, preferably to a pressure of between 0 and 0.9 bar, and/or by simultaneously mechanically pressing on the patterns arranged on a given cross-section of the tube.

The patterns are for example cylindrical patterns, of the type known under the name of Yoshimura, Waterbomb, Kresling or Chicken Wire pattern, preferably of the Kresling type.

The step of deforming the patterns is for example a folding step. The step of manufacturing a tube made mainly of plastic material is for example a step of manufacturing a tube made only of plastic material.

The step of manufacturing a tube made mainly of plastic material is carried out by thermoforming, injection blow moulding, moulding or rotational moulding. The engraving means comprise a laser. The marking means comprise a wheel. The step of producing a plurality of patterns on the tube by an engraving and/or marking means is carried out by laser engraving then by marking with a wheel.

If the mode at rest required for the inflatable cylinder is the retracted mode, the method comprises, preferably after the step of deforming the patterns, a step of curing by annealing the expandable tubular element thus obtained, so that its mode at rest is the retracted mode.

In order to manufacture an inflatable cylinder, an expandable tubular element manufactured as described above is attached to an end piece. More precisely, one or each end of the expandable tubular element is arranged on a flange of the end piece and clamped thereon by means of an attachment element of the end piece. Alternatively, an expandable tubular element can be bonded to an end piece.

An example of the operation of an inflatable cylinder according to the first embodiment will now be described.

As shown on FIG. 1, the expandable tubular element of the inflatable cylinder 1 is in an expanded mode. The fluid pressure inside the expandable tubular element 3 is then between 1 and 12 bar. Fluid is evacuated out of the expandable tubular element 3 via the means 19 for supplying and/or evacuating fluid arranged on an end piece 5. Consequently, the fluid pressure in the expandable tubular element 3 decreases, causing the expandable tubular element 3 to retract until the expandable tubular element 3 is in a retracted mode, shown on FIG. 2. In the retracted mode, the fluid pressure inside the expandable tubular element 3 is then between 0 and 1 bar.

Inversely, when the expandable tubular element 3 is in a retracted mode and it is desired to switch the expandable tubular element 3 to an expanded mode, fluid is introduced into the expandable tubular element 3 via the means 19 for supplying and/or evacuating fluid arranged on an end piece 5. Consequently, the fluid pressure in the expandable tubular element 3 increases, causing the expandable tubular element 3 to expand until the expandable tubular element 3 is in an expanded mode, shown on FIG. 1.

The invention is not limited to the embodiments described and other embodiments will be clearly apparent to those skilled in the art.

As an alternative or in addition to holding the peripheral wall 7 in the end piece 5, 41 by clamping as described above, the end piece 5, 41 and the peripheral wall 7 can also be bonded together. The end piece 5, 41 may also comprise fluid and/or electrical energy connections.

Furthermore, at least one of the links 11 can be formed by an adhesive film connecting two adjacent panels 9.

Lastly, at least one of the panels 9 can be made from an insert of rigidity greater than that of the links 11, the insert being for example metallic, the insert being encapsulated in a plastic material to form the panel 9. This increases the rigidity of the panel 9 thus produced.

LIST OF REFERENCES

1: inflatable cylinder
3: expandable tubular element
5: end piece
7: peripheral wall
9: panel
11: link
13: node
15: flange
17: attachment element
19: means for supplying and/or evacuating fluid
21: central hole
23: electrically conductive layer
25: plate
27: plate
29: inflatable cylinder
31: inflatable cylinder
33: attachment hole
35: inflatable cylinder
37: expandable tubular element
39: inflatable cylinder
41: end piece
43: flange
45: lateral hole
47: attachment hole
49: guide means
51: telescopic guide rod
53: guide rod
55: means for transferring energy
57: sheath

The invention claimed is:

1. An expandable tubular element for a fluid-inflatable cylinder, comprising:
   a peripheral wall that is fluid-tight and formed by a plurality of panels connected in pairs by rectilinear links each representing a pivot axis:
   the links being made mainly of plastic material,
   the panels being more rigid than the links, so that two panels adjacent to a link can rotate about the pivot axis represented by this link,
   each end of a link being connected to an end of at least two other links to define a node, and
   each node having a thickness greater than the minimum thickness of the adjacent links,
      wherein the expandable tubular element expands when a fluid is injected into the expandable tubular element, and
      wherein a sheath configured to limit the stroke of the fluid-inflatable cylinder is arranged outside the peripheral wall.

2. The expandable tubular element according to claim 1, wherein the nodes have the same thickness as the panels.

3. The expandable tubular element according to claim 2, wherein at least one of the links has a composition that is the same as at least some of the panels adjacent to said link and, at least in places, a thickness that is less than that of these panels.

4. The expandable tubular element according to claim 3, wherein the peripheral wall is composed of a composite or multilayer material.

5. The expandable tubular element according to claim 4, wherein the peripheral wall is composed of a multilayer material and comprises an electrically conductive layer.

6. The expandable tubular element according to claim 2, wherein the peripheral wall is composed of a composite or multilayer material.

7. The expandable tubular element according to claim 6, wherein the peripheral wall is composed of a multilayer material and comprises an electrically conductive layer.

8. The expandable tubular element according to claim 1, wherein at least one of the links has a composition that is the same as at least some of the panels adjacent to said link and, at least in places, a thickness that is less than that of these panels.

9. A fluid-inflatable cylinder comprising:
   an expandable tubular element according to claim 1 and
   an end piece attached to one end of the expandable tubular element.

10. The inflatable cylinder according to claim 9, wherein:
    the end piece includes a means for supplying and/or evacuating fluid,
    the expandable tubular element is configured to switch from a retracted mode in which the expandable tubular element has a first inner volume to an expanded mode in which the expandable tubular element has a second inner volume and a cylindrical shape,
    the second inner volume is greater than the first inner volume by at least a factor of 10.

11. The inflatable cylinder according to claim 9, wherein: the peripheral wall is bonded to the end piece, or the end piece includes a flange and an attachment element, the peripheral wall being held in the end piece by clamping between the flange and the attachment element.

12. A method for manufacturing an expandable tubular element according to claim 1, comprising the following steps:

manufacturing a tube made mainly of plastic material, producing a plurality of patterns on the tube by engraving and/or marking means, and deforming the patterns, so that the patterns in the deformed state form the links, the step of deforming the patterns being carried out by reducing the pressure inside the tube to a pressure of between 0 and 0.9 bar, and/or by mechanically pressing on the patterns arranged on a given cross-section of the tube.

* * * * *